May 25, 1954     T. E. BROWN     2,679,232
BUILDER'S TAPE DISPENSING DEVICE
Filed Nov. 13, 1950
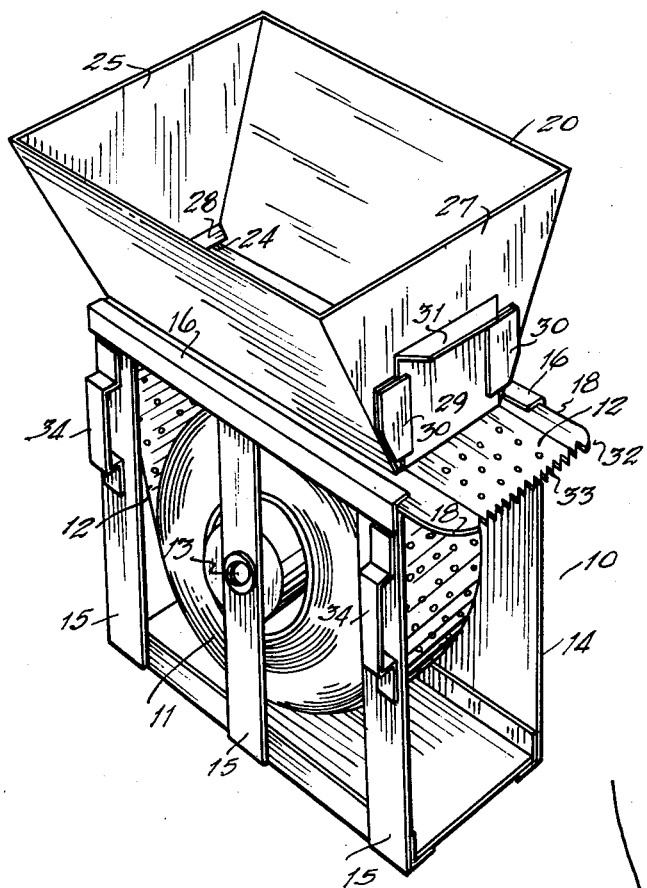
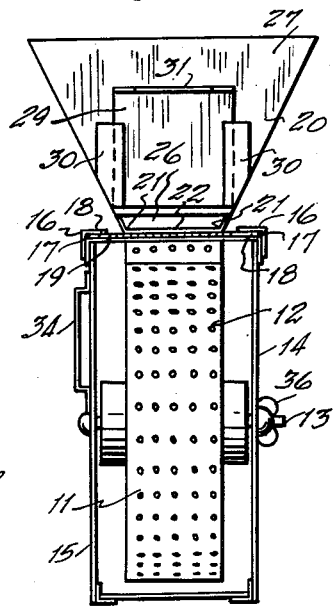
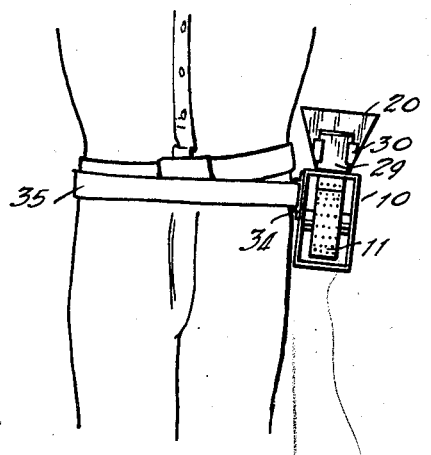
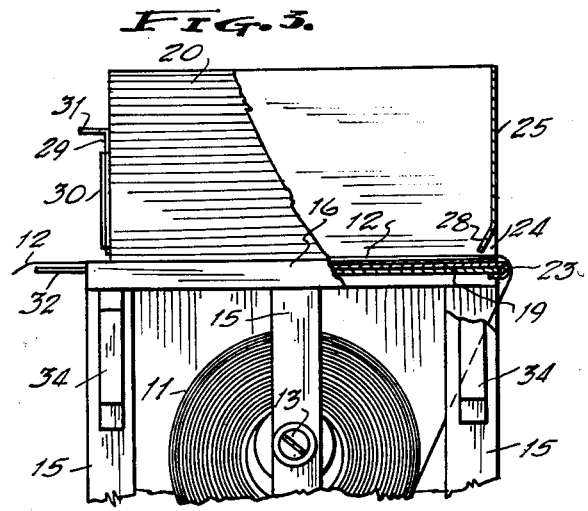
Tracey E. Brown
INVENTOR.
BY Cecil L. Wood
ATTORNEY

UNITED STATES PATENT OFFICE 2,679,232

BUILDER'S TAPE DISPENSING DEVICE

Tracey Edward Brown, Fort Worth, Tex., assignor of fifty per cent to W. Roy Hoyler, Fort Worth, Tex.

Application November 13, 1950, Serial No. 195,227

2 Claims. (Cl. 118—413)

This invention relates to apparatus for dispensing tape for masking joints in wallboard, and the like, in building structures, ordinarily installed by interior decorators, and its principal object resides in the provision of a portable base or frame member having means therein for supporting a reel of tape which can be dispensed therefrom in various lengths, as desired, and drawn through a hopper containing a cementitious material, or an adhesive, which adheres to the tape, and adapts the same to be applied directly to the work, affording a means whereby the operator can carry the assembly attached to his belt, and which is operative from either side of the body so that right- or left-hand persons may utilize the device in drawing the tape through the hopper and applying the same to the work.

Another object of the invention is that of affording a means whereby a hopper can be attached to the tape-supporting frame or base member and is capable of being removed therefrom or reversed, adapting the assembly to right- or left-hand manipulation, and affording a means, which is associated with said hopper, to regulate the thickness of adhesives or cementitious material adhering to the tape so that the proper amount of adhesive can be applied to the tape for individual or particular requirements in the application of various decorative finishes on wallboard.

Broadly, the invention contemplates the provision of a simple and inexpensive dispensing apparatus for masking or decorator's tape which can be employed in a stationary position, or may be carried on the person of the operator and be constantly in operative relationship to the operator at all times, whereby such tape can be dispensed at will and applied with the least amount of difficulty and with a maximum saving in time and effort.

While the foregoing objects are paramount, other and lesser objects will become manifest as the description proceeds, taken in connection with the appended drawings wherein:

Figure 1 is a perspective view of the invention, illustrating the tape operatively arranged in the base portion, and showing the hopper through which the tape is dispensed.

Figure 2 is a front elevational view of the invention, showing the adjustable closure for the discharge outlet for the tape from the hopper.

Figure 3 fragmentarily illustrates the invention, from one side thereof, showing a portion cut away to illustrate the manner in which the tape is drawn through the hopper, and Figure 4 illustrates the manner in which the invention is supported on a belt arranged about the waist of the operator.

The invention, therefore, comprises a base portion 10 which is preferably rectangular in form and provides a housing or support for a reel 11 of tape 12 which is supported on a pivot 13 arranged transversely through the base 10, in the manner shown particularly in Figure 1. The base 10, while illustrated in the drawings as having one solid wall 14, opposing an open side comprising a plurality of stays or standards 15, it is apparent that the base 10 may be an open frame work, if desired, and having a keeper member 16 arranged longitudinally thereof on each of the opposing longitudinal edges of the top of the housing 10 defining channels 17 to slidably receive the extending edges 18 of the plate 19 supporting a hopper 20 detachably secured to the base 10, in the manner shown in Figure 1.

It is apparent, therefore, that the hopper 20 has inclined sides so that the top is flared. It is desirable to form the hopper 20 from a single strip of metal with suitable brakes 21 along each side of the bottom 22 which is attached to the plate 19. The rigid connection between the hopper 20 and the plate 19 adapts the hopper to be removed from the base 10 by sliding the same longitudinally thereof, and thus also provide for reversing the hopper 20 on the base 10 for right- or left-hand operation.

The tape 12 is extended over the rear end 23 of the plate 19, which is rolled, as apparent in Figure 3, and through a slot or elongated opening 24 in the lower portion of the rear end wall 25 of the hopper 20, thence longitudinally thereof and out of a similar opening 26 in the front wall 27. A baffle 28 is arranged in the opening 24 which inclines inwardly, as shown in Figure 3. The forward opening 26 has a closure member 29 which is adapted to vertical adjustment, being slidably arranged in opposing keeper members 30 on each side of the opening 26, as apparent in Figures 1 and 2, a flange 31 being formed on the upper end of the closure 29 by which the same can be manipulated.

The hopper 20 is adapted to contain a cementitious material, or adhesive, usually of a consistency of a paste, which is applied to the tape 12 as the same is passed through the hopper 20, and the adjustable closure 29 can be arranged so that a relatively thin coating of the material adheres to the tape 12 as it emerges from the hopper 20 and passes over the extended portion 32 of the plate 19 whose outer end 33 is serrated to expedite tearing off lengths of the tape 12. A pair of loops 34 are attached to certain of the members 15 through which a belt 35 can be arranged for securing the assembly to the person, as illustrated in Figures 1 and 4.

In reversing the operation of the device it is desirable to also reverse the reel 11 of the tape 12 by removing the pivot 13 which is secured by a thumb-nut 36. It is apparent that the device may be modified in many respects without departing from the spirit and intent of the invention or the scope of appended claims.

What is claimed is:

1. In a dispensing device for decorator's tape, in combination with a frame having a pivot means arranged transversely thereof for operatively supporting a reel of tape therein, a hopper detachably supported on said frame over said reel, the said hopper having a base plate providing a bottom therefor and projecting from each side longitudinally of said hopper, a keeper member arranged along each side of the top of said frame defining channels for said extending portions of said hopper bottom, an opening in each end of said hopper near the bottom thereof, and an adjustable closure for one of said openings.

2. In a tape dispensing apparatus, in combination with a portable frame having means for rotatably supporting a reel of tape therein, a hopper for a cementitious material detachably supported on said frame above said reel of tape, a keeper member forming a horizontal channel longitudinally of each side of the top of said frame, a flange formed along the base of said hopper on each side thereof and adapted to slidably extend into said channels, an opening in each end of said hopper and at the base thereof whereby said tape can be drawn therethrough and an adjustable closure for one of said openings adapted to be moved vertically with respect to said tape.

References Cited in the file of this patent

UNITED STATES PATENTS

| Number | Name | Date |
|---|---|---|
| 825,660 | Klousnitzer | July 10, 1906 |
| 964,133 | Strehler | July 10, 1910 |
| 1,764,423 | Stone | June 17, 1930 |
| 2,128,123 | Dailey | Aug. 23, 1938 |
| 2,149,307 | Nash | Mar. 7, 1939 |
| 2,190,766 | Bennett | Feb. 20, 1940 |
| 2,357,992 | Banghart | Sept. 12, 1944 |